United States Patent [19]
Fujita et al.

[11] Patent Number: 5,283,513
[45] Date of Patent: Feb. 1, 1994

[54] BATTERY CHARGING DEVICE FOR ELECTRIC VEHICLES

[75] Inventors: Shigeo Fujita; Hideki Toyota; Takahiro Iwata, all of Wako, Japan

[73] Assignee: Honda Giken Kogyo Kabushiki Kaisha, Tokyo, Japan

[21] Appl. No.: 880,797

[22] Filed: May 8, 1992

[30] Foreign Application Priority Data

May 8, 1991 [JP] Japan .................. 3-102826

[51] Int. Cl.$^5$ .............................................. H02J 7/00
[52] U.S. Cl. .................................. 320/56; 320/2; 307/10.1
[58] Field of Search .............. 320/2, 56; 307/10.1, 307/10.7; 180/65.1

[56] References Cited

U.S. PATENT DOCUMENTS

| | | | |
|---|---|---|---|
| 3,270,267 | 8/1966 | Nolte | 320/56 |
| 3,838,327 | 9/1974 | Uemichi et al. | 320/2 |
| 3,898,547 | 8/1975 | Poole | 320/2 |
| 4,617,506 | 10/1986 | Bogie et al. | 320/2 |
| 4,638,236 | 1/1987 | Carr | 320/21 |
| 4,678,981 | 7/1987 | Murray | 320/2 |

FOREIGN PATENT DOCUMENTS 57-211946  12/1982  Japan .................. H02J 9/06
63-194568  8/1988  Japan .................. H02M 3/28

*Primary Examiner*—Steven L. Stephan
*Assistant Examiner*—Thomas M. Dougherty
*Attorney, Agent, or Firm*—Lyon & Lyon

[57] ABSTRACT

A battery charging device for electric vehicles with a high-voltage battery, has a first connector to be connected with a high-voltage power source outside the vehicle, a second connector to be connected with a low-voltage power source outside the vehicle, a DC-DC converter for increasing the voltage of the low-voltage power source to a voltage corresponding to the high-voltage battery and a switch for changing-over the connectors are provided. In an emergency where the residual electric energy of the battery is less than required to run the required distance, the electric vehicle can easily be supplied with electric power from other vehicles such as a gasoline engine vehicle having a low-voltage power source and charge the battery by converting the supplied voltage by way of the DC-DC converter to a voltage corresponding to the voltage of the high-voltage battery.

13 Claims, 6 Drawing Sheets

BATTERY CHARGING DEVICE FOR ELECTRIC VEHICLES

BACKGROUND OF THE INVENTION

1. Field of the Invention

The present invention relates to a battery charging device for charging batteries of electric vehicles by selective use of a high-voltage or low-voltage electric power source outside the vehicle.

2. Description of Background Art

Efforts have been made in recent years to develop electric vehicles in the hope of building transportation means free of environmental pollution, however, many problems, especially concerning batteries, must be solved before realizing a wide spread of the electric vehicles.

Namely, a high-voltage battery is necessary to realize a practical electric vehicle running with electric power of a battery, or a battery of a large capacity is necessary to enable an electric vehicle a long distance drive. In addition, the electric vehicle is equipped with various auxiliary electric equipment necessary for driving, which must be supplied with electric power.

There has been proposed a high-voltage supply system including a DC-DC converter equipped between a battery and a driving motor of an electric vehicle for supplying an increased voltage to the driving motor by converting a low-voltage of the battery to a high-voltage (for instance, Japanese Laid-Open Patent publication No. 63-194568). There has also been proposed a low-voltage supply system in which a high-voltage of the battery is decreased to a low-voltage by a DC-DC converter for supplying auxiliary electric equipment with a low-voltage electric power (for instance, Japanese Laid-Open Patent Publication No. 57-211946).

For the purpose of realizing a long-distance drive by an electric vehicle, it will be necessary to equip the vehicle with a large capacity battery, or to provided electric power supply stations for electric vehicles over a wide area. However, different from vehicles running by gasoline for which many gasoline stations have been provided all over the land, the number of electric power supply stations available for electric vehicles is possibly limited. On the other hand, it is possible to provide the vehicle with a supplemental battery besides a main battery, however, this solution will also be improper because such a supplemental battery may cause an increased weight of the vehicle.

SUMMARY OF THE INVENTION

A general object of the present invention is to provide a battery charging device for electric vehicles, which enables the vehicle to receive supplemental electric power for charging a high-voltage battery thereof from another vehicle which is other than an electric vehicle and has a low-voltage electric power source, when the residual amount of electric energy in the battery of the electric vehicle is less than required for the residual distance to run before reaching the destination.

To attain the above-mentioned object, the battery charging device of the present invention comprises: a battery for storing electric energy to drive the electric vehicle; a first connector for connecting the battery to a high-voltage power source outside the electric vehicle to charge the battery; a second connector for connecting the battery to a low-voltage power source outside the electric vehicle to charge the battery; switching means for making selection between the first and second connectors and for connecting the battery with a selected power source; and a DC-DC converter for converting the low-voltage supplied through the second connector to a voltage corresponding to the high-voltage.

Another object of the present invention is to provide a battery charging device for electric vehicles, in which the above-mentioned switching means comprises a control circuit and an electro-magnetic switch for selecting the first connector or the second connector based on a control signal outputted from the control circuit.

Still another object of the present invention is to provide a battery charging device for electric vehicles, in which the above-mentioned control circuit comprises a first calculating circuit for calculating a residual amount of electric energy of the battery.

Yet still another object of the present invention is to provide a battery charging device for electric vehicles, in which the above-mentioned control circuit comprises a second calculating circuit for calculating electric energy required for the electric vehicle to run a desired distance inputted by the driver.

A further object of the present invention is to provide a battery charging device for electric vehicles, in which the above-mentioned control circuit comprises a judging circuit for comparing a residual amount of electric energy of the battery with a required amount of electric energy for the electric vehicle to run a desired distance inputted by the driver and for generating a select signal for making the switching means to select the second connector when the required amount of electric energy is larger than the residual amount of electric energy.

A still further object of the present invention is to provide a battery charging device for electric vehicles, in which the above-mentioned judging circuit generates an alarm signal to activate alarm means when the electric energy of the battery reaches, during the charging, the required electric energy to run the desired distance.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustration, and thus are not limitative of the present invention, and wherein.

DETAILED DESCRIPTION OF THE PREFERRED EMBODIMENTS

Figure 1:
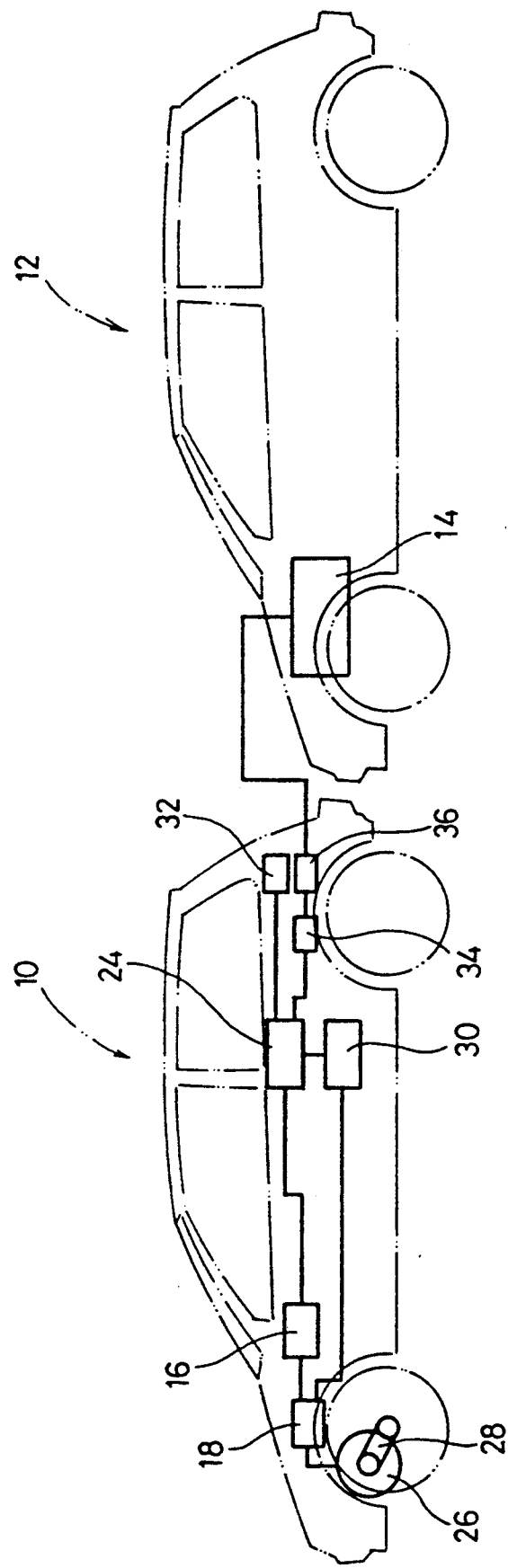
FIG. 1 is a schematic diagram showing an electric vehicle, equipped with the battery charging device according to the present invention, coupled with another gasoline engine vehicle.

FIG. 1 schematically shows how to charge the battery of an electric vehicle 10 by a battery charging device as an embodiment of the present invention, in which a battery 14 of another gasoline engine vehicle 12 is connected to the electric vehicle 10.

Figure 2:
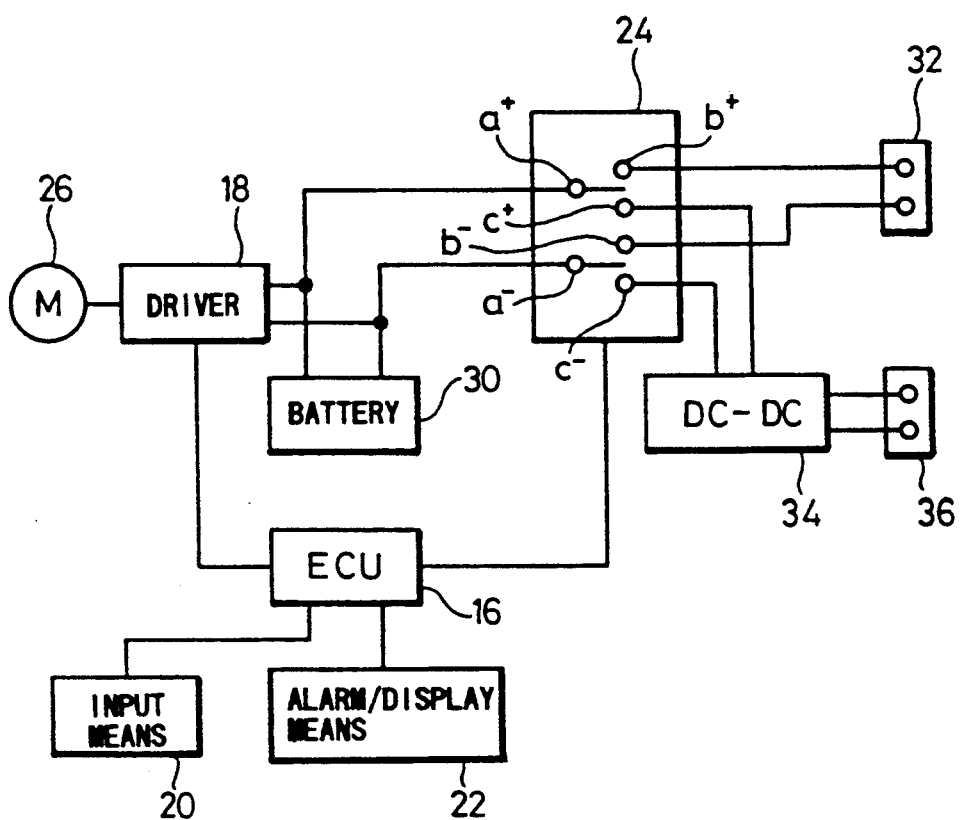
FIG. 2 is a block diagram showing the construction of the battery charging device shown in FIG. I.

The electric vehicle 10, as shown in FIG. 2, is intensively controlled by an electronic control unit 16 (hereinafter referred to as an "ECU 16"), to which are connected a driver 18, input means 20, alarm/display means 22 and an electromagnetic switch 24. The driver 18, supplied with a predetermined high-voltage power (approximately 150 volts) from a high-voltage battery 30, drives a motor 26, which rotates wheels via a transmission 28 (refer to FIG. 1).

The switch 24 has three sets of terminals: $a^+$ and $a^-$ connected with two terminals of the battery 30; $b^+$ and $b^-$ connected with two terminals of a first connector 32; and $c^+$ and $c^-$ connected with two terminals on the output side of a DC-DC converter 34. The connection between these three sets of terminals is controlled by the ECU 16 whereby switch 24 and ECU 16 comprise a switching means. Two terminals on the input side of the DC-DC converter 34 are connected with two terminals of a second connector 36. The two terminals of the first connector 32 are adapted to be selectively connected with a high-voltage power source (not shown) outside the electric vehicle corresponding to the high-voltage battery 30, to rapidly charge the battery 30. The two terminals of the second connector 36 are, as shown in FIG. 1, adapted to be selectively connected with the battery 14 of the gasoline engine vehicle 12, as a low-voltage power source outside the electric vehicle. The DC-DC converter 34 increases voltage from the voltage of battery 14 to that of the battery 30.

Figure 3:
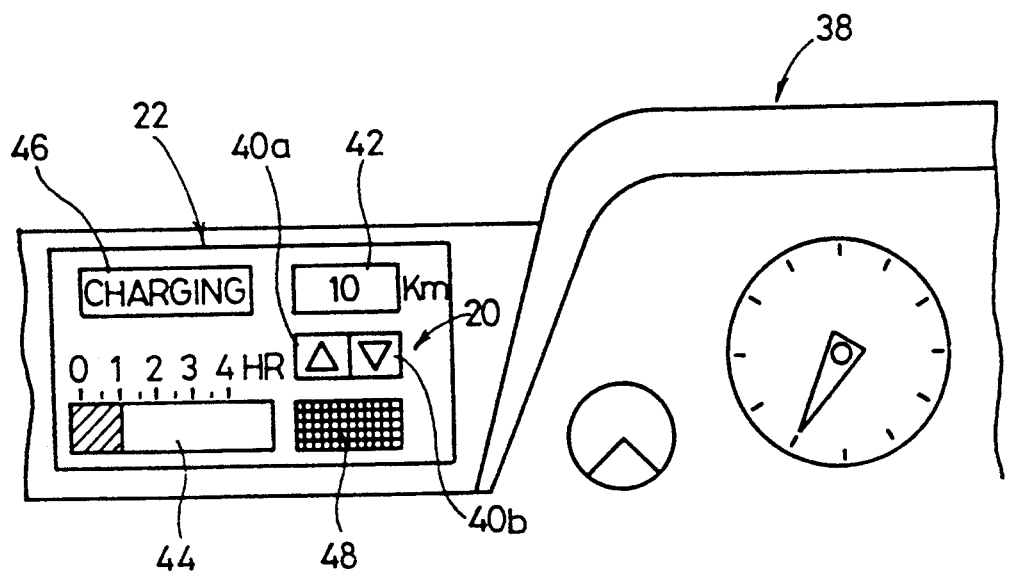
FIG. 3 is an illustration of input means and alarm/display means of the battery charging device according to the present invention.
Figure 4:
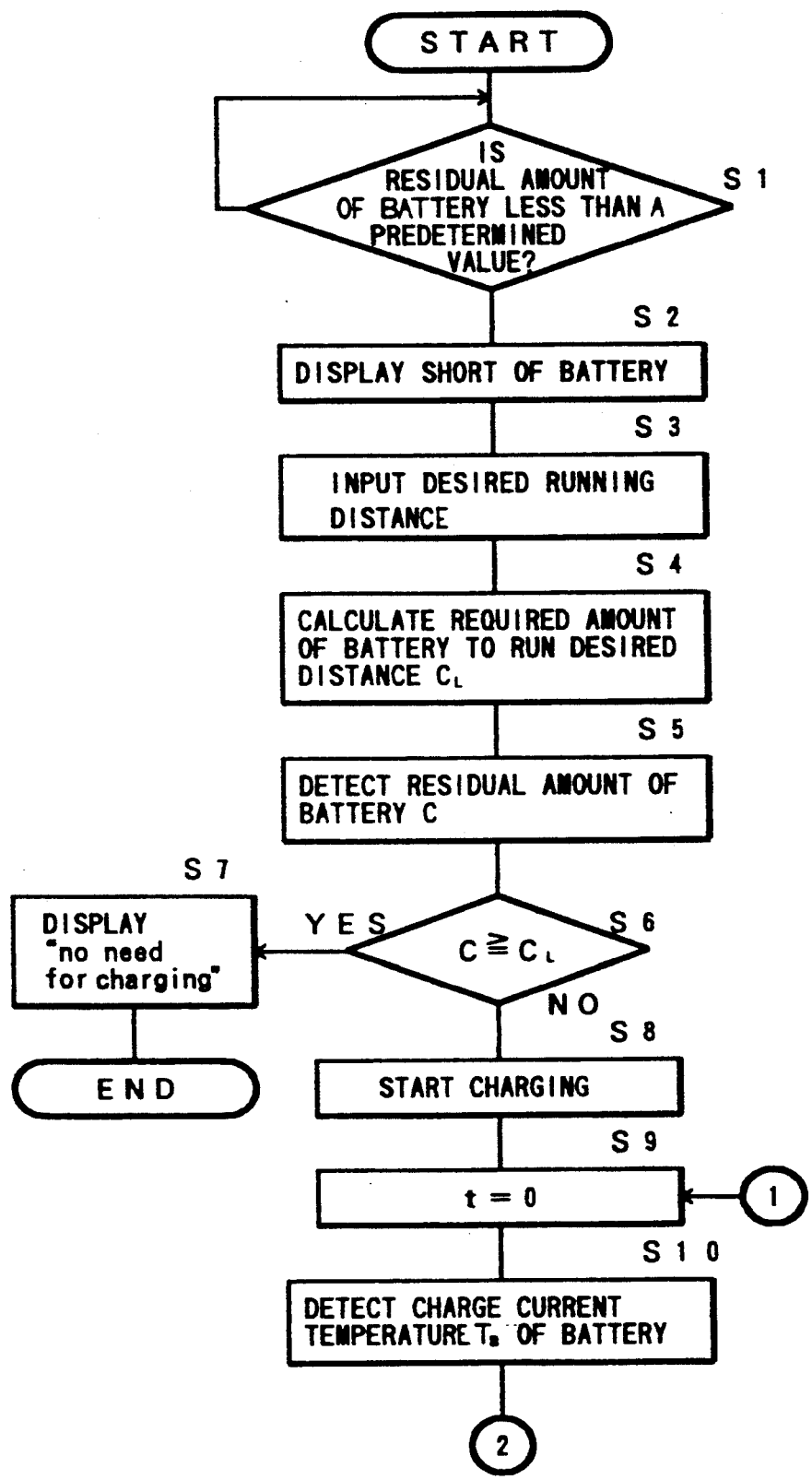
FIGS. 4 and 5 are flow-charts showing operations performed by the battery charging device according to the present invention.
Figure 5:
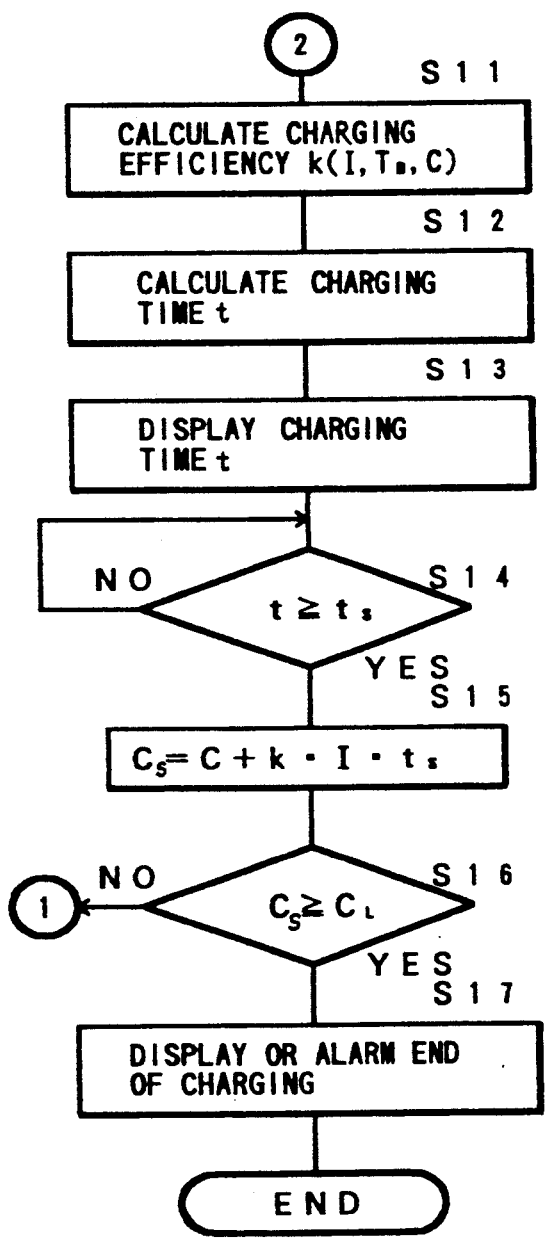

The input means 20 and alarm/display means 22 are, as shown in FIG. 3, provided on an instrument panel 38 of the electric vehicle 10. The input means 20 is provided for the driver to set a desired running distance, and has an up-button 40a and a down-button 40b. Above the buttons 40a and 40b is placed a desired distance display 42 for displaying the desired running distance L set by the driver. The alarm/display means 22 includes a charge time display 44 for displaying a time required for charging the battery, a charging state display 46 for displaying that the battery is under charging and a speaker 48 for informing of the end of charging. The battery charging device according to this embodiment is constituted as explained above, and the operations thereof are explained hereafter by reference to flow-charts shown in FIGS. 4 and 5.

The ECU 16 monitors constantly during navigation whether the residual amount of electric energy of the battery is beyond a predetermined level (step S1), and if it finds otherwise, instructs the instrument panel 38 to display the shortage of battery (step 52). Then the driver sets, using the up-button 40a and down-button 40b, a desired running distance L between the point at which the shortage of battery is detected and the destination which he/she wishes to arrive at (step S3). The desired distance L is displayed on the desired distance display 42.

The ECU 16, then, calculates a required amount $C_L$ of electric energy of the battery to run the desired distance L (step S4), calculates a current residual amount C of electric energy of the battery (step S5), and compares the required amount $C_L$ obtained in step 54 with the residual amount C (step S6). If $C \geq C_L$, the ECU 16 terminates the operation after displaying "no need for charging" (step S7), and the driver continues driving.

If $C < C_L$, the driver stops the electric vehicle 10 near a gasoline engine vehicle 12 and the ECU 16 connects the terminals $a^+$ and $a^-$ on the battery 30 side of the switch 24 with the terminals $c^{30}$ and $c^-$ on the DC-DC converter 34 side by controlling the switch 24, while the driver connects the second connector 36 with the battery 14 of a gasoline engine vehicle 12 to start the charging (step S8). ECU 16 can inform the driver of the state of "under charging" by turning-on the charging state display 46 of the alarm/display means 22.

The ECU 16, then, sets the charge time t to t=0 (step 59), and detects the charge current I flowing through the battery 30 and the temperature $T_B$ of the battery 30 (step S10). Incidentally, as explained later, the charge time t represents the required time after the charge current I, temperature $T_B$ and residual amount C of the battery are revised. Next, the ECU 16 calculates a charging efficiency $k(I, T_B, C)$ from the charge current I, temperature $T_B$ and residual amount C of the battery (step S11). The charging efficiency $k(I, T_B, C)$ varies depending on the kind and other factors of the battery 30 used.

Then, the charge time t is calculated according to the formula (step 512):

$$t = (C_L - C)/(k \cdot I)$$

This charge time t is displayed on the charge time display 44 of the alarm/display means 22, as the residual time before the completion of charging (step 513).

The ECU 16 compares the charge time t with a predetermined time $t_S$ (step S14) and when a lapse of time $t_S$ is detected, the values of the charge current I, temperature $T_B$ and residual amount C of the battery are renewed, in which the residual amount of electric energy of the battery 30 is revised by $C_S = C + k \cdot I \cdot t_S$ (step S15). If $C_S \geq C_L$, the ECU 16 terminates the operation after displaying the completion of charging or alarming the end of charging (steps S16 and S17). The display of the completion of charging can be made by extinguishing the charging state display 46 or by displaying zero on the charge time display 44, and the alarming for the end of charging can be made by generating a sound by the speaker 48. If $C_S < C_L$, the operations after the step of S9 are repeated.

As explained above, the electric power supplied from the battery 14 of the gasoline engine vehicle 12 via the second connector 36 is voltage-converted to a suitable voltage corresponding to the battery 30 of the electric vehicle 10, and then supplied through the switch 24 to the battery 30 for charging. The charging of the battery 30 can be done not only while the electric vehicle 10 is standing, but also while moving, for instance, while being pulled.

Figure 6:
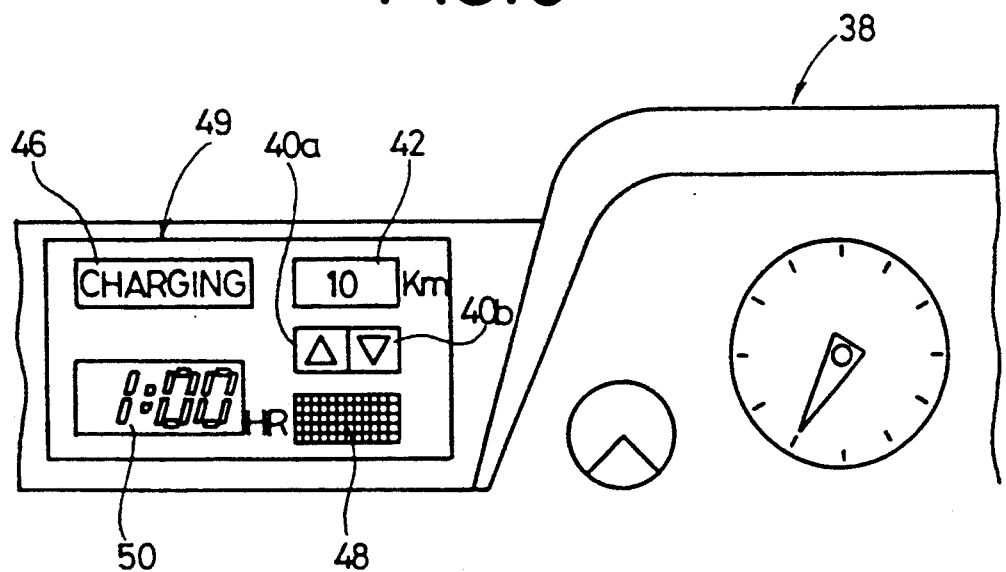
FIG. 6 is an illustration of input means and alarm/display means of the battery charging device as another embodiment of the present invention.

FIG. 6 illustrates another embodiment of the alarm/display means. In this embodiment, the alarm/display means 49 makes a display 50 of the charge time digitally using, for instance, a seven-element LCD display. As the alarm/display means, various modifications from that shown in FIG. 6 are possible.

To summarize, in the battery charging device for electric vehicles of the present invention, a first connector to be connected with a high-voltage power source outside the vehicle and a second connector to be connected with a low-voltage power source outside the vehicle are provided, and the voltage of the low-voltage power source is increased by a DC-DC converter to a voltage corresponding to the high-voltage battery of the electric vehicle and supplied to the battery for charging. By the present invention mentioned above, it becomes possible to receive electric power from other vehicles such as gasoline engine vehicle having low-voltage power source, thereby to easily supplement, especially in an emergency, the shortage of electric energy required for the electric vehicle to run a desired distance.

Although certain preferred embodiments have been shown and described, it should be understood that many changes and modifications may be made therein without departing the scope of appended claims.

What is claimed is:

1. A battery charging device for electric vehicles comprising:
   a high-voltage battery for storing electric energy to drive the electric vehicle;
   a first connector for connecting the battery to a high-voltage power source outside the electric vehicle to charge the battery;
   a second connector for connecting the battery to a low-voltage power source outside the electric vehicle to charge the battery;
   switching means for making a selection between the first and second connectors and for connecting the battery with a selected power source; and
   a DC-DC converter for converting the low-voltage supplied through the second connector to a voltage corresponding to the high-voltage.

2. The device according to claim 1, wherein said switching means comprises a control circuit and an electromagnetic switch for selecting the first connector or the second connector based on a control signal outputted from the control circuit.

3. The device according to claim 2, wherein said control circuit comprises first calculating means for calculating a residual amount of electric energy of the battery.

4. The device according to claim 3, wherein said control circuit comprises second calculating means for calculating a required amount of electric energy for the electric vehicle to run a desired distance, in response to a desired distance inputted by the driver.

5. The device according to claim 4, wherein said control circuit comprises means for comparing said residual amount of electrical energy of the battery determined by said first calculating means with said required amount of electric energy determined by said second calculating means, and means for generating a select signal when said required amount of electric energy exceeds said residual amount of electrical energy for causing the switching means to select the second connector.

6. The device according to claim 4, wherein said control circuit comprises means for generating an alarm signal to thereby activate an alarm means when the electric energy of the battery attains, by charging, said required amount of electric energy determined by said second calculating means.

7. A battery charging device for an electric vehicle with a high-voltage battery for driving the vehicle, comprising means for selectively connecting the battery to one of either a high-voltage or a low-voltage power source outside the electric vehicle to charge the battery, and means for converting the low-voltage when selectively supplied from the low-voltage power source to charge the battery to a voltage corresponding to the high-voltage.

8. The device according to claim 7, further comprising a control circuit connected to the battery, said control circuit comprising first calculating means for calculating a residual amount of electric energy of the battery.

9. The device according to claim 8, wherein said control circuit comprises second calculating means for calculating a required amount of electric energy for the electric vehicle to run a desired distance, in response to a desired distance inputted by the driver.

10. The device according to claim 9, wherein said control circuit comprises means for comparing said residual amount of electric energy of the battery determined by said first calculating means with said required amount of electric energy determined by said second calculating means, and means for generating a select signal when said required amount of electric energy exceeds said residual amount of electric energy for causing said means for selectively connecting the battery to select the low-voltage power source.

11. The device according to claim 10, wherein sad control circuit comprises means for generating an alarm signal to thereby activate an alarm means when the electric energy of the battery attains, by charging, said required amount of electric energy determined by said second calculating means.

12. The device according to claim 9, wherein said control circuit comprises means for comparing said residual amount of electric energy of the battery determined by said first calculating means with said required amount of electric energy determined by said second calculating means, and means for discontinuing battery charging when said residual amount of electric energy at least equals said required amount of electric energy.

13. The device according to claim 12, wherein said control circuit comprises means for generating an alarm signal to thereby activate an alarm means when the electric energy of the battery attains, by charging, said required amount of electric energy determined by said second calculating means.

* * * * *